United States Patent
Huang et al.

(10) Patent No.: US 10,922,818 B1
(45) Date of Patent: Feb. 16, 2021

(54) METHOD AND COMPUTER SYSTEM FOR OBJECT TRACKING

(71) Applicant: Wistron Corporation, New Taipei (TW)

(72) Inventors: Kuo-Ting Huang, New Taipei (TW); Zhen-Te Liu, New Taipei (TW); Yu-Yen Chen, New Taipei (TW); Ching-An Cho, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/656,584

(22) Filed: Oct. 18, 2019

(30) Foreign Application Priority Data

Aug. 16, 2019 (TW) .............................. 108129314 A (51) Int. Cl.
*G06T 7/00* (2017.01)
*G06T 7/20* (2017.01)

(52) U.S. Cl.
CPC ...... *G06T 7/20* (2013.01); *G06T 2207/10016* (2013.01); *G06T 2207/20081* (2013.01); *G06T 2207/20092* (2013.01)

(58) Field of Classification Search
CPC ............. G06T 7/20; G06T 2207/20092; G06T 2207/20081; G06T 2207/10016
See application file for complete search history.

(56) References Cited

U.S. PATENT DOCUMENTS

| 9,165,204 | B2 * | 10/2015 | Othmezouri | ......... | G06K 9/6297 |
| 10,592,786 | B2 * | 3/2020 | Taghavi | ................... | G06K 9/66 |
| 10,747,988 | B2 | 8/2020 | Xie | | |
| 2018/0067605 | A1 * | 3/2018 | Lin | ......................... | G06N 20/00 |
| 2018/0129906 | A1 * | 5/2018 | Habibian | ............. | G06K 9/4628 |
| 2019/0034700 | A1 | 1/2019 | Xie | | |
| 2019/0130580 | A1 * | 5/2019 | Chen | .................... | G06K 9/6267 |
| 2019/0138801 | A1 * | 5/2019 | Psota | ........................ | G06T 7/60 |
| 2019/0180153 | A1 * | 6/2019 | Buckler | ............. | G06K 9/00147 |
| 2020/0089962 | A1 * | 3/2020 | Narang | ................ | G06K 9/6267 |

FOREIGN PATENT DOCUMENTS

| CN | 101221620 | 7/2008 |
| CN | 105760826 | 7/2016 |

OTHER PUBLICATIONS

"Office Action of Taiwan Counterpart Application", dated Jul. 31, 2020, p. 1-p. 18.

* cited by examiner

*Primary Examiner* — Bobbak Safaipour
(74) *Attorney, Agent, or Firm* — JCIPRNET (57) ABSTRACT

A method and a computer system for object tracking are provided. The method includes the following steps. An image sequence including multiple images with a target object is obtained. A labelling operation corresponding to the target object in first two images and last two images in the image sequence is received to respectively generate four ground truth labels of the target object. A forward tracking of the target object is performed on the image sequence in time series according to the ground truth labels of the first two images to obtain a forward tracking result. A backward tracking of the target object is performed on the image sequence in time series according to the ground truth labels of the last two images to obtain a backward tracking result. The forward and the backward tracking results are compared to accordingly generate a final tracking result of the target object.

20 Claims, 10 Drawing Sheets

METHOD AND COMPUTER SYSTEM FOR OBJECT TRACKING

CROSS-REFERENCE TO RELATED APPLICATION

This application claims the priority benefit of Taiwan application serial no. 108129314, filed on Aug. 16, 2019. The entirety of the above-mentioned patent application is hereby incorporated by reference herein and made a part of this specification.

BACKGROUND

Technical Field

The disclosure relates to a technology for object tracking, and more particularly, to a method and a computer system for object tracking.

Description of Related Art

The most common applications for deep learning are image recognition and object tracking. However, the biggest problem is the difficulty of object recognition. In a common use such as general face recognition or palm recognition, a public database may be used to assist in recognition. In an uncommon use such as fall recognition or bed motion recognition, one has to collect data by himself in order to perform recognition in an uncommon use.

SUMMARY OF THE INVENTION

In view of this, the disclosure provides a method and a computer system for object tracking. When a target object is labelled from a plurality of images of an image sequence, the target object may be automatically tracked from other images to speed up the tracking of the target object.

In an embodiment of the disclosure, the aforementioned method is applicable to a computer system, and includes the following steps. An image sequence including multiple images with a target object is obtained. A labelling operation corresponding to the target object in first two images and last two images in the image sequence is received to respectively generate four ground truth labels of the target object. A forward tracking of the target object is performed on the image sequence in time series according to the ground truth labels of the first two images to obtain a forward tracking result. A backward tracking of the target object is performed on the image sequence in time series according to the ground truth labels of the last two images to obtain a backward tracking result. The forward tracking result and the backward tracking result are compared to accordingly generate a final tracking result of the target object.

In an embodiment of the disclosure, the aforementioned computer system includes a display, an input device and a computing device. The display is configured to display a frame. The input device is configured to receive an operation of a user. The computing device is configured to: obtain an image sequence including a plurality of images and having a target object; receive a labelling operation corresponding to the target object in first two images and last two images in the image sequence to respectively generate four ground truth labels of the target object; perform a forward tracking of the target object on the image sequence in time series according to the ground truth labels of the first two images to obtain a forward tracking result; perform a backward tracking of the target object on the image sequence in time series according to the ground truth labels of the last two images to obtain a backward tracking result; and compare the forward tracking result and the backward tracking result to accordingly generate a final tracking result of the target object.

In order to make the aforementioned and other objectives and advantages of the disclosure comprehensible, embodiments accompanied with figures are described in detail below.

DESCRIPTION OF THE EMBODIMENTS

Some embodiments of the disclosure will be described in detail below with reference to the accompanying drawings. For reference symbols used in the following descriptions, same reference symbols in different drawings represent same or similar components. These embodiments are merely a part of the present disclosure, and do not disclose all possible implementations of the disclosure. Rather, these embodiments are merely examples of a method and a computer system within the scope of the patent application of the disclosure.

Figure 1:
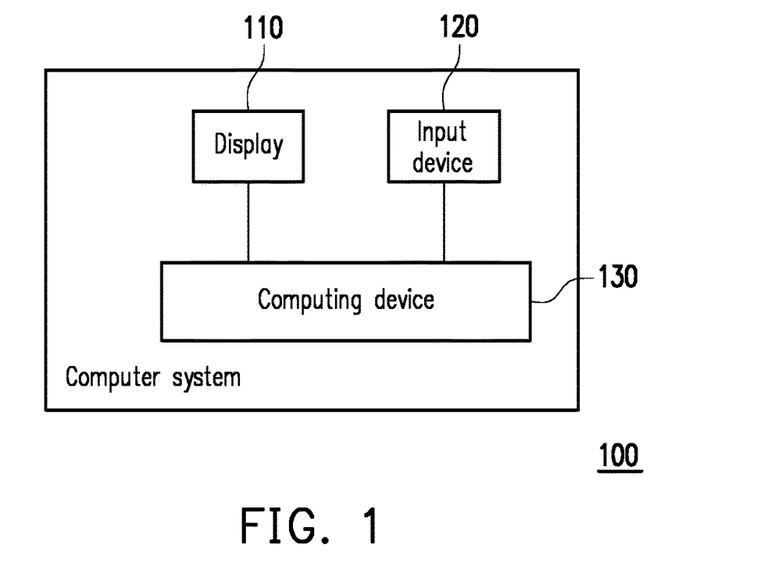
FIG. 1 is a block diagram of a computer system according to an embodiment of the disclosure.

FIG. 1 is a block diagram of a computer system according to an embodiment of the disclosure. However, the figure is for convenience of description only and is not intended to limit the disclosure. FIG. 1 first introduces all components and configuration relationships in the computer system. The detailed functions will be disclosed in conjunction with FIG. 2.

In the present embodiment, a computer system 100 includes a display 110, an input device 120 and a computing device 130. In an embodiment, the display 110, the input device 120 and the computing device 130 may belong to three different devices. The computing device 130 may be connected to the display 110 and the input device 120 by wired or any wireless communication standard, and may be, for example, a personal computer, a server computer, a workstation system or platform, or the like. In an embodiment, the display 110 and the computing device 130 may be integrated into an electronic device having a display, such as an all-in-one computer. The input device 120 may be connected to the computing device 130 by wired or any wireless communication standard. In an embodiment, the display 110, the input device 120 and the computing device 130 may also be integrated into a single device, such as a notebook computer, a tablet computer or a smart phone. The disclosure is not limited thereto.

The display 110 is configured to display a frame. The display may be, for example, a liquid-crystal display (LCD), a light-emitting diode (LED) display, or other similar devices. The input device 120 may be, for example, an input device that allows a user to interact with the display frame of the display 110, such as a handheld controller having a motion sensor, a mouse, a joystick, or a trackball. In an embodiment, the display 110 and the input device 120 may further be a touch screen that provides both display and input functions, i.e., a display that integrates touch detection elements. The touch detection elements are disposed on the display in lines and rows, and configured to detect the touch of the fingers and palm of the user or other objects on the touch screen. The touch detection elements may be, for example, capacitive touch detection elements, resistive touch detection elements, surface acoustic wave touch detection elements, electromagnetic touch detection elements, optical touch detection elements, or near field imaging touch detection elements.

The computing device 130 includes a memory and a processor. The memory is configured to store images, codes or other data, and may be, for example, any type of fixed or mobile random access memory (RAM), read-only memory (ROM), flash memory, hard disk, or other similar devices, integrated circuits and a combination thereof. The processor is configured to control an operation between components of the computing device 130. The processor may be, for example, a central processing unit (CPU), a graphics processing unit (GPU), or other programmable general-purpose or special-purpose microprocessors, digital signal processors (DSP), programmable controllers, application specific integrated circuits (ASIC), programmable logic devices (PLD) or other similar devices, integrated circuits and a combination thereof.

Figure 2:
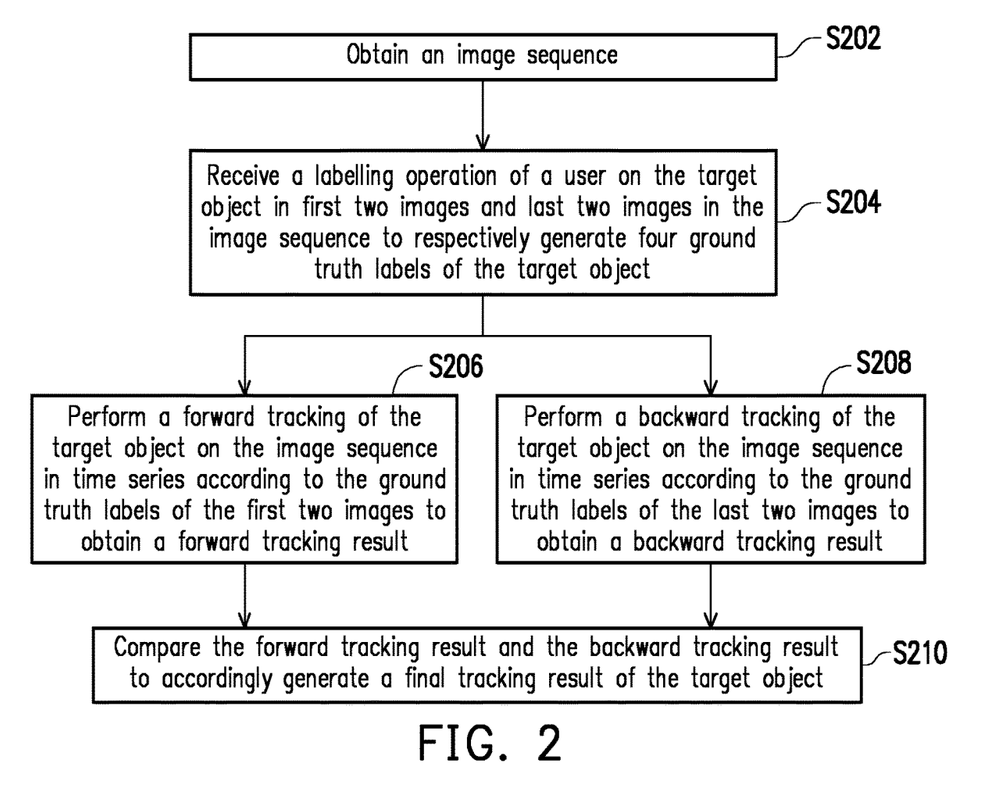
FIG. 2 is a flow chart of a method for object tracking according to an embodiment of the disclosure.

FIG. 2 is a flow chart of a method for object tracking according to an embodiment of the disclosure. The steps of FIG. 2 may be implemented by various elements of the computer system 100 illustrated in FIG. 1.

Referring to FIG. 1 and FIG. 2 simultaneously, first, the computing device 130 of the computer system 100 obtains an image sequence (step S202), where the image sequence includes a plurality of images having a target object. In the present embodiment, the image sequence may have a playing length of 10 seconds. At a playing rate of 30 fps, the image sequence may include 300 images.

Next, the computing device 130 receives a labelling operation of a user on the target object in first two images and last two images in the image sequence to respectively generate four ground truth labels of the target object (step S204). Here, the computing device 130 may first display the first two images and the last two images on the display 110 separately or simultaneously for being viewed by the user, and the user may perform a labelling operation on the target object through the input device 120. Next, the computing device 130 receives the labelling operation of the user on the target object in the first two images and the last two images through the input device 120 to respectively generate four ground truth labels of the target object.

Figure 3:
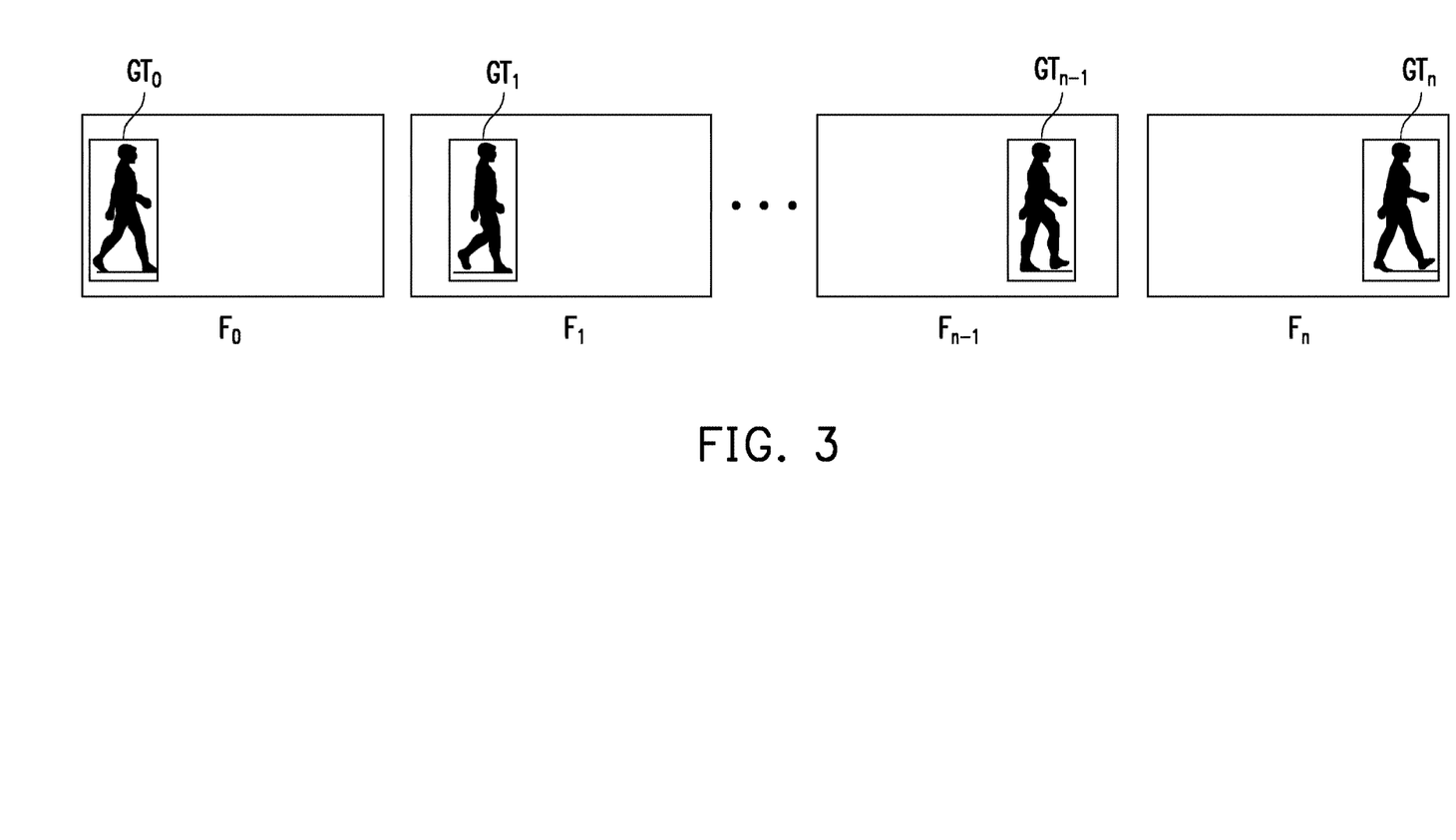
FIG. 3 is a schematic diagram of an image sequence according to an embodiment of the disclosure.

The labelling operation here may be that the user labels the target object from the first two images and the last two images through the input device 120 in a box selection or corner click selection manner. The target object in the four images is a result of manual labelling and thus regarded as a ground truth. FIG. 3 is a schematic diagram of an image sequence according to an embodiment of the disclosure. For example, the user performs a labelling operation of the target object on first two images $F_0$, $F_1$ and last two images $F_{n-1}$, $F_n$ to respectively obtain ground truth labels $GT_0$, $GT_1$, $GT_{n-1}$, $GT_n$. The preset here may be: performing the labelling operation on the target object by using a rectangular frame, but the disclosure is not limited thereto.

Next, the computing device 130 performs a forward tracking of the target object on the image sequence in time series according to the ground truth labels of the first two images to obtain a forward tracking result (step S206). Here, the computing device 130 performs tracking of the target object in other following images following the first two images in the image sequence from earliest to latest in time series by using the ground truth labels of the first two images (i.e., from a third image in the image sequence to a last image) to obtain a forward tracking result of the target object.

In addition, the computing device 130 performs a backward tracking of the target object on the image sequence in time series according to the ground truth labels of the last two images to obtain a backward tracking result (step S208). Here, the computing device 130 performs tracking of the target object in other preceding images preceding the last two images in the image sequence from latest to earliest in time series by using the ground truth labels of the last two images (i.e., from a last third image in the image sequence to the first image) to obtain a backward tracking result of the target object.

Then, the computing device 130 compares the forward tracking result and the backward tracking result to accordingly generate a final tracking result of the target object (step S210). In detail, the forward tracking result and the backward tracking result are timing predictions for the same target object in the image sequence; therefore, when both the forward tracking result and the backward tracking result are correct, the two results of either forward tracking or backward tracking of the target object in the image sequence will have a high overlapping rate to generate a reliable final tracking result. It can be seen that once the user labels the target object from a plurality of first and last images in the image sequence, the computing device 130 may automatically track the target object from other images to speed up the tracking of the target object.

In order to clarify the aforementioned flow, the details of the aforementioned flow will be described below with reference to a flow chart of a method for object tracking according to an embodiment of the disclosure in FIG. 4. The steps of FIG. 4 may be implemented by various elements of the computer system 100 illustrated in FIG. 1.

Figure 4:
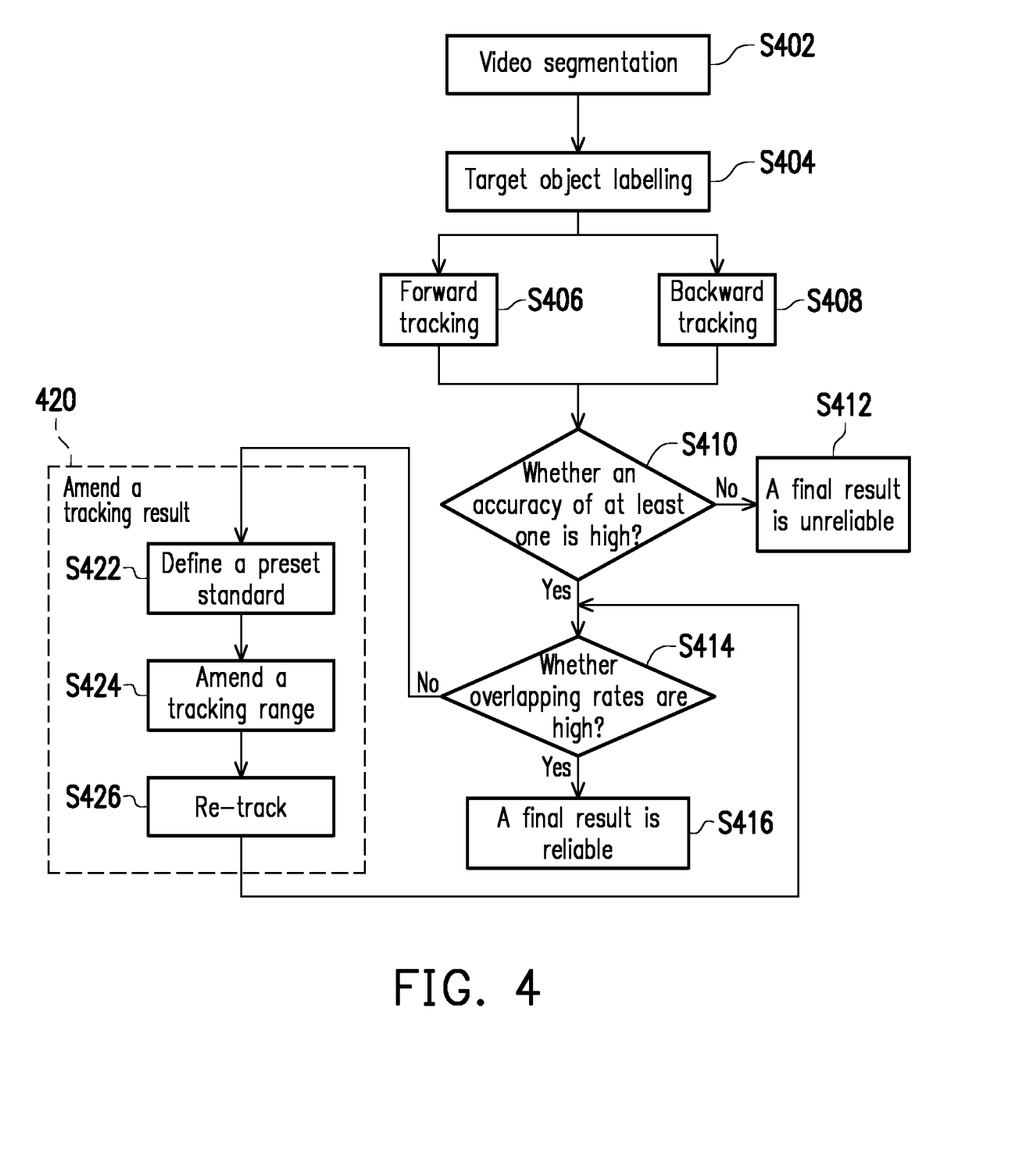
FIG. 4 is a flow chart of a method for object tracking according to an embodiment of the disclosure.

Referring to FIG. 1 and FIG. 4 simultaneously, first, when the computing device 130 of the computer system 100 obtains an input video, the device may detect a playing length of the input video to perform a video segmentation (step S402). In detail, a maximum playing length of each video clip here may be set to 10 seconds (at a playing rate of 30 fps, the video clip may include 300 images). For example, when the playing length of an input video is 16 seconds, the computing device 130 segments the input video into two videos of 10 seconds and 6 seconds. The reason for the segmentation is that, in the following processing in the present embodiment, after the forward tracking and the backward tracking are compared, an unreliable tracking result will be amended. If the playing length of the input video is too large, a tracking result may be amended for too many times, which causes difficulty in amendment. Therefore, the playing length of the input video will be limited. However, the set video playing length may be adjusted as required. The disclosure is not limited thereto.

After the video segmentation is completed, the computing device 130 generates an image sequence. The image sequence includes a plurality of images having a target object. Next, the computing device 130 allows the user to label the target object for first two images and last two images in the image sequence by using the display 110 and the input device 120 (step S404). The details of step S404 are similar to step S204. The descriptions thereof are omitted herein.

Then, the computing device 130 performs a forward tracking of the target object on the image sequence in time series according to the ground truth labels of the first two images (step S406) to obtain a forward tracking result. In detail, the computing device 130 computes a ground truth distance difference between the two ground truth labels of the first two images, and predicts tracking ranges and predicted positions of the target object in other images (hereinafter referred to as "other following images") following the first two images in the image sequence from earliest to latest in time series according to the ground truth distance difference as the forward tracking result of the target object.

Figure 5:
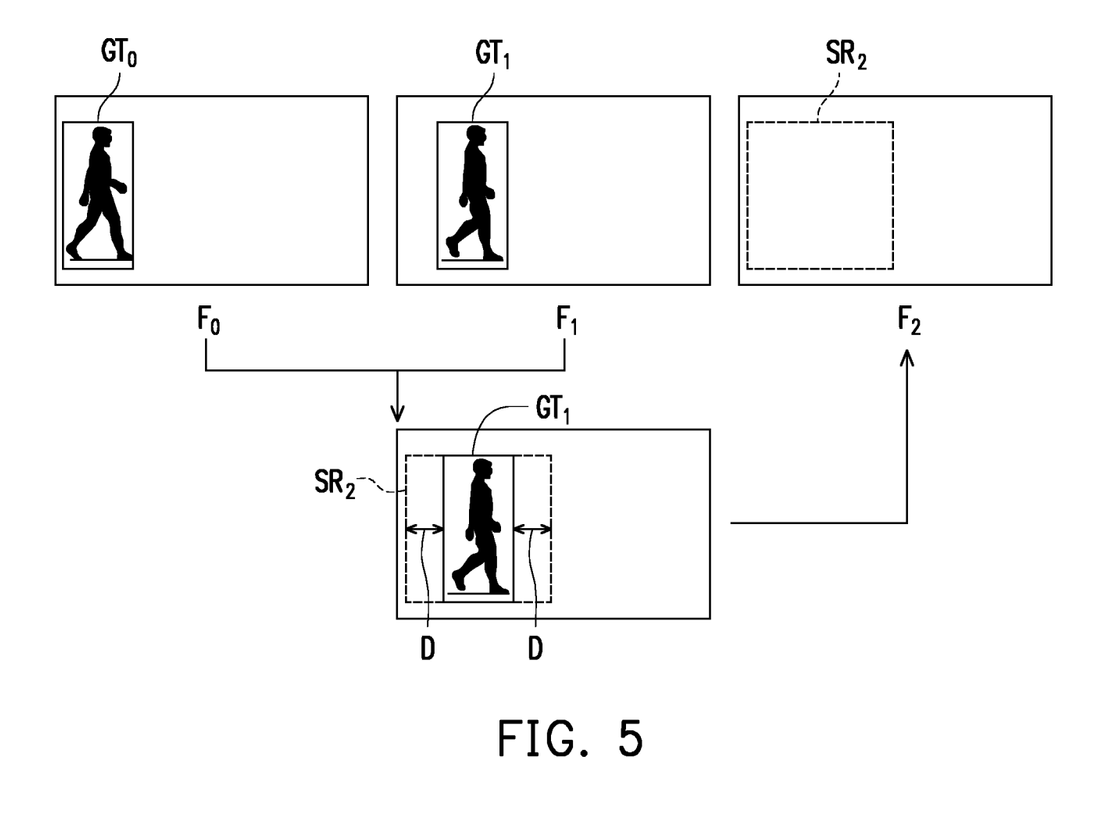
FIG. 5 is a schematic diagram of a forward tracking according to an embodiment of the disclosure.

Specifically, FIG. 5 is a schematic diagram of a forward tracking according to an embodiment of the disclosure.

Referring to FIG. 1 and FIG. 5 simultaneously, the computing device 130 obtains ground truth labels $GT_0$, $GT_1$ of the user in first two images $F_0$, $F_1$ for the target object, and computes a distance difference D in a horizontal direction between the ground truth labels $GT_0$, $GT_1$. Since the distance difference D is computed according to the two ground truth labels $GT_0$, $GT_1$, the distance difference D is also referred to as a "ground truth distance difference". Next, the computing device 130 predicts a tracking range $SR_2$ of the target object in a next image (third image) $F_2$ according to the distance difference D. Here, since the distance difference of the target object between the first two images $F_0$, $F_1$ is D, it may be assumed that a distance difference of the target object between the image $F_1$ and the image $F_2$ is also D. That is, the computing device 130 may extend the distance D to both sides in the horizontal direction centring on the ground truth label $GT_1$ of the image $F_1$ to define the tracking range $SR_2$. Incidentally, in the present embodiment, it is only assumed that the target object moves only in the horizontal direction, and therefore the range is not extended to a vertical direction when predicting the tracking range. However, in practical applications, the computing device 130 may set the tracking range by considering the distance differences in the horizontal direction and the vertical direction simultaneously. The disclosure is not limited thereto.

Next, the computing device 130 obtains a predicted position of the target object in the third image $F_2$ within the tracking range $SR_2$ by using an algorithm for object tracking such as mean shift. In detail, the target object is tracked within the tracking range $SR_2$ by using the features in the ground truth label $GT_1$ through the mean shift algorithm to obtain the predicted position of the target object in the third image $F_2$. In addition, the computing device 130 computes a distance difference of the target object between the third image $F_2$ and the second image $F_1$. Since the distance difference has been computed according to the predicted position, the distance difference is also referred to as a "predicted distance difference". Similarly, the computing device 130 computes a tracking range and a predicted position of the target object in a fourth image according to the distance difference between the third image and the second image, and recursively computes tracking ranges and predicted positions of the target object in the fourth image and other following images thereof until the process proceeds to the last image in the image sequence. In other words, in the case of the forward tracking, in addition to the first two images in the image sequence, each of the other images will obtain a tracking range and a predicted position of the target object as the forward tracking result of the target object.

Referring back to FIG. 4, in addition, the computing device 130 performs a backward tracking of the target object on the image sequence in time series according to the ground truth labels of the last two images (step S408) to obtain a backward tracking result. In detail, the computing device 130 computes a ground truth distance difference between the two ground truth labels of the last two images, and predicts tracking ranges and predicted positions of the target object in other images (hereinafter referred to as "other preceding images") preceding the last two images in the image sequence from latest to earliest in time series according to the ground truth distance difference as the backward tracking result of the target object.

The details of the backward tracking are similar to that of the forward tracking except that the forward tracking proceeds backwards from the first image in the image sequence, while the backward tracking proceeds forwards from the last image in the image sequence. That is, the computing device 130 computes a tracking range of the target object in a last third image in the image sequence according to the ground truth distance difference between the two ground truth labels of the last two images, and obtains the predicted position of the target object within the tracking range in the last third image by using the algorithm for object tracking. In addition, the computing device 130 computes a distance difference of the target object between the last third image and a last second image. Since the distance difference has been computed according to the predicted position, the distance difference is also referred to as a "predicted distance difference".

Similarly, the computing device 130 computes a tracking range of the target object in a last fourth image according to the distance difference between the last third image and the last second image, and recursively computes tracking ranges and predicted positions of the target object in the last fourth image and other preceding images thereof until the process proceeds to the first image in the image sequence. In other words, in the case of the backward tracking, in addition to the last two images in the image sequence, each of the other images will obtain a tracking range and a predicted position of the target object as the backward tracking result of the target object.

The computing device 130 determines whether at least one of the forward tracking and the backward tracking has a high accuracy after completing the forward tracking and the backward tracking (step S410) to serve as an important basis for generating the final tracking result of the target object later. Here, the accuracy of the forward tracking is determined according to the ground truth label in the last image and the forward tracking result. The accuracy of the backward tracking is determined according to the ground truth label in the first image and the backward tracking result.

In the case of the forward tracking, the computing device 130 determines an overlapping rate between the ground truth label of the target object in the last image and a predicted position associated with the forward tracking result (hereinafter referred to as "target object overlapping rate"). In response to the target object overlapping rate being greater than an overlapping threshold, the computing device 130 determines that the accuracy of the forward tracking is high. In response to the target object overlapping rate not being greater than the overlapping threshold, the computing device 130 determines that the accuracy of the forward tracking is low.

Figure 6:
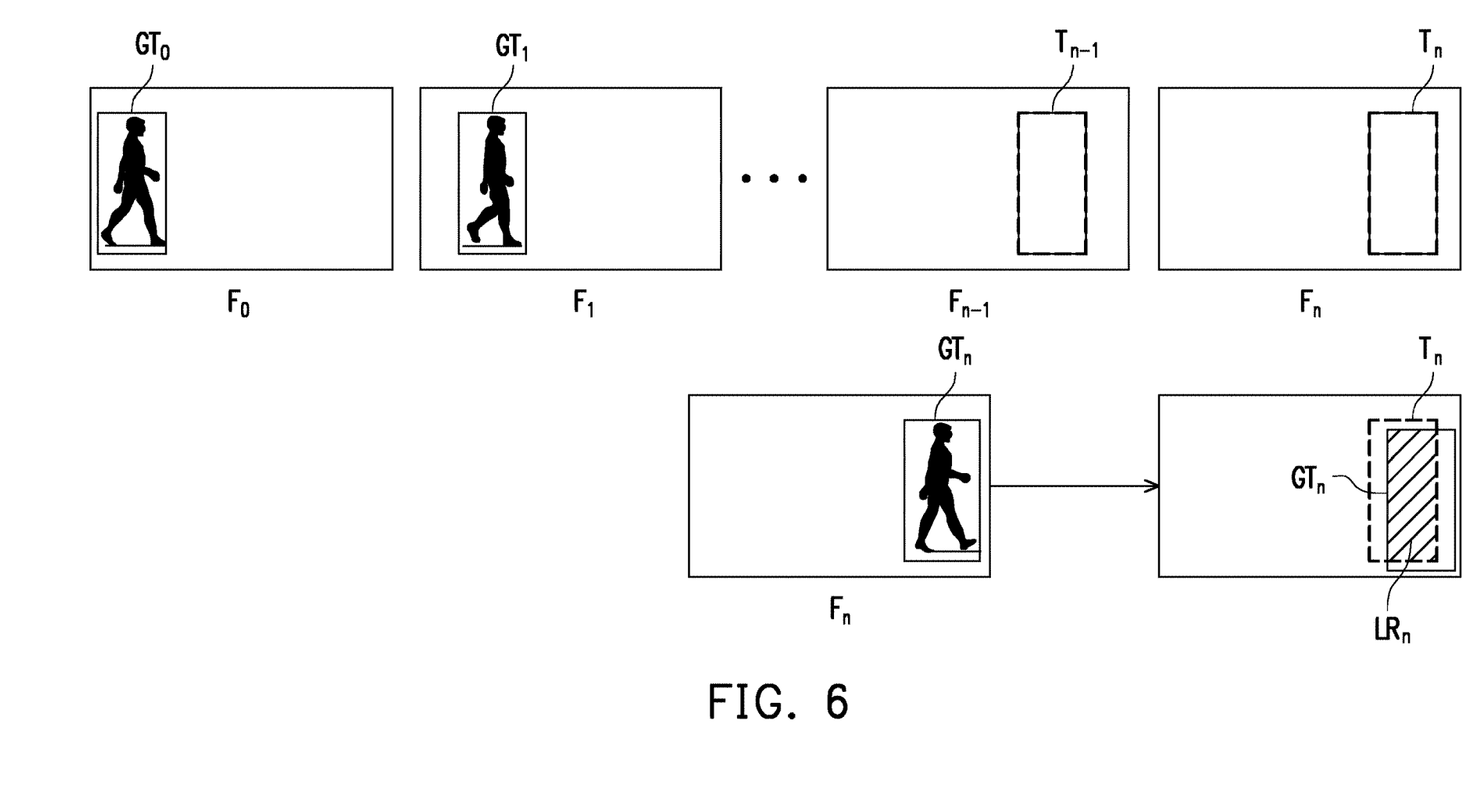
FIG. 6 is a schematic diagram of a forward tracking according to an embodiment of the disclosure.

FIG. 6 is a schematic diagram of a forward tracking according to an embodiment of the disclosure. For example, first two images $F_0$, $F_1$ in an image sequence $F_0$-$F_n$ have ground truth labels $GT_0$, $GT_1$ obtained by the user performing a labelling operation on the target object. In addition, $T_n$ is a predicted position, obtained by the forward tracking, of the target object in a last image $F_n$, and $T_{n-1}$ is a predicted position, obtained by the forward tracking, of the target object in a last second image $F_{n-1}$. The computing device 130 determines an overlapping rate $LR_n$ between the ground truth label $GT_n$ of the target object in the last image $F_n$ and the predicted position $T_n$ in the last image $F_n$, i.e., an intersection. It is assumed that the overlapping threshold is 90%. If the overlapping rate $LR_n$ between the ground truth label $GT_n$ and the predicted position $T_n$ in the last image $F_n$ is greater than 90%, it is indicated that the accuracy of the forward tracking is high. Otherwise, if the overlapping rate $LR_n$ between the ground truth label $GT_n$ and the predicted position $T_n$ in the last image $F_n$ is not greater than 90%, it is indicated that the accuracy of the forward tracking is low.

Further, in the case of the backward tracking, the computing device 130 determines a target object overlapping rate between the ground truth label of the target object in the first image and a predicted position associated with the backward tracking result. In response to the target object overlapping rate being greater than an overlapping threshold, the computing device 130 determines that the accuracy of the backward tracking is high. In response to the target object overlapping rate not being greater than the overlapping threshold, the computing device 130 determines that the accuracy of the backward tracking is low.

Referring back to FIG. 4, in response to both of the accuracy of the forward tracking and the accuracy of the backward tracking being low, the computing device 130 determines that the final tracking result is unreliable (step S412). In this case, the tracking results in both directions are incorrect, which may be caused by excessive image noise or a particularly complicated background. In the present embodiment, the computing device 130 may display the image sequence on the display 110 for the user to determine the problem or to perform manual labelling through the input device 120. Moreover, the labelling operation of the target object performed by the user on other images in the image sequence separately is received from the input device 120 so that the image sequence may be used in subsequent applications.

In response to at least one of the accuracy of the forward tracking and the accuracy of the backward tracking being high, the computing device 130 further determines the overlapping rate (i.e., "target object overlapping rate") of each predicted position of the target object in the forward tracking result and the backward tracking result so as to accordingly determine whether to amend the forward tracking result and the backward tracking result. Here, the computing device 130 may first determine whether all of the target object overlapping rates of the forward tracking result and the backward tracking result are high (step S414). In response to the determination being affirmative, the computing device 130 does not amend the forward tracking result and the backward tracking result, and determines that the final tracking result is reliable (step S416). The tracking of the target object in the image sequence is ended.

Figure 7:
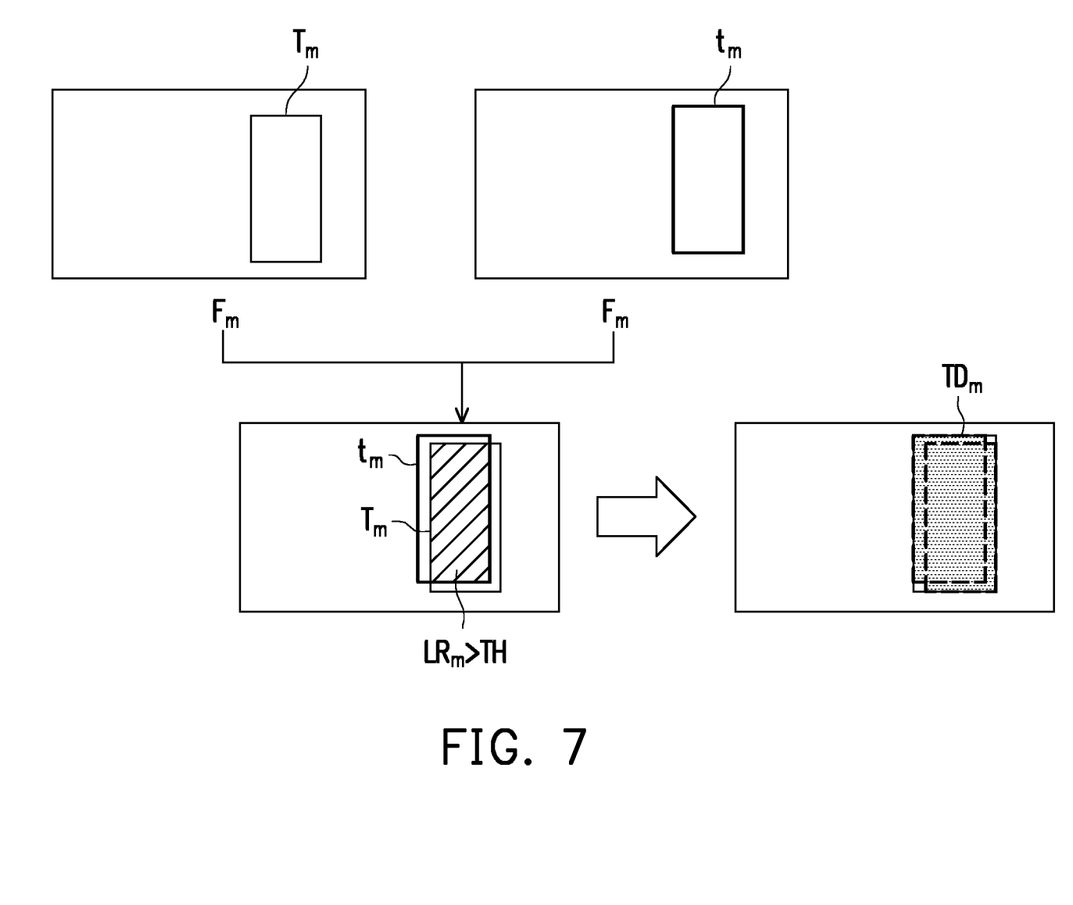
FIG. 7 is a schematic diagram of a final tracking result of one of images according to an embodiment of the disclosure.

FIG. 7 is a schematic diagram of a final tracking result of one of images $F_m$ according to an embodiment of the disclosure. It is assumed that $T_m$ is a predicted position, obtained by the forward tracking, of the target object in the image $F_m$ and $t_m$ is a predicted position, obtained by the backward tracking, of the target object in the image $F_m$. Here, the computing device 130 determines that a target object overlapping rate $LR_m$ of the predicted position $T_m$ and the predicted position $t_m$ in the image $F_m$ is greater than an overlapping threshold TH. In the present embodiment, the computing device 130 may use a union $TD_m$ of the predicted position $T_m$ of the forward tracking result and the predicted position $t_m$ of the backward tracking result as the final tracking result of the target object in the image $F_m$.

Referring back to FIG. 4, when the computing device 130 determines that not all of the target object overlapping rates of the forward tracking result and the backward tracking result are high, it is represented that a reliable final tracking result cannot be generated. Therefore, the process proceeds to a tracking result amendment 420 to amend at least one of the forward tracking result and the backward tracking result.

Figure 8:
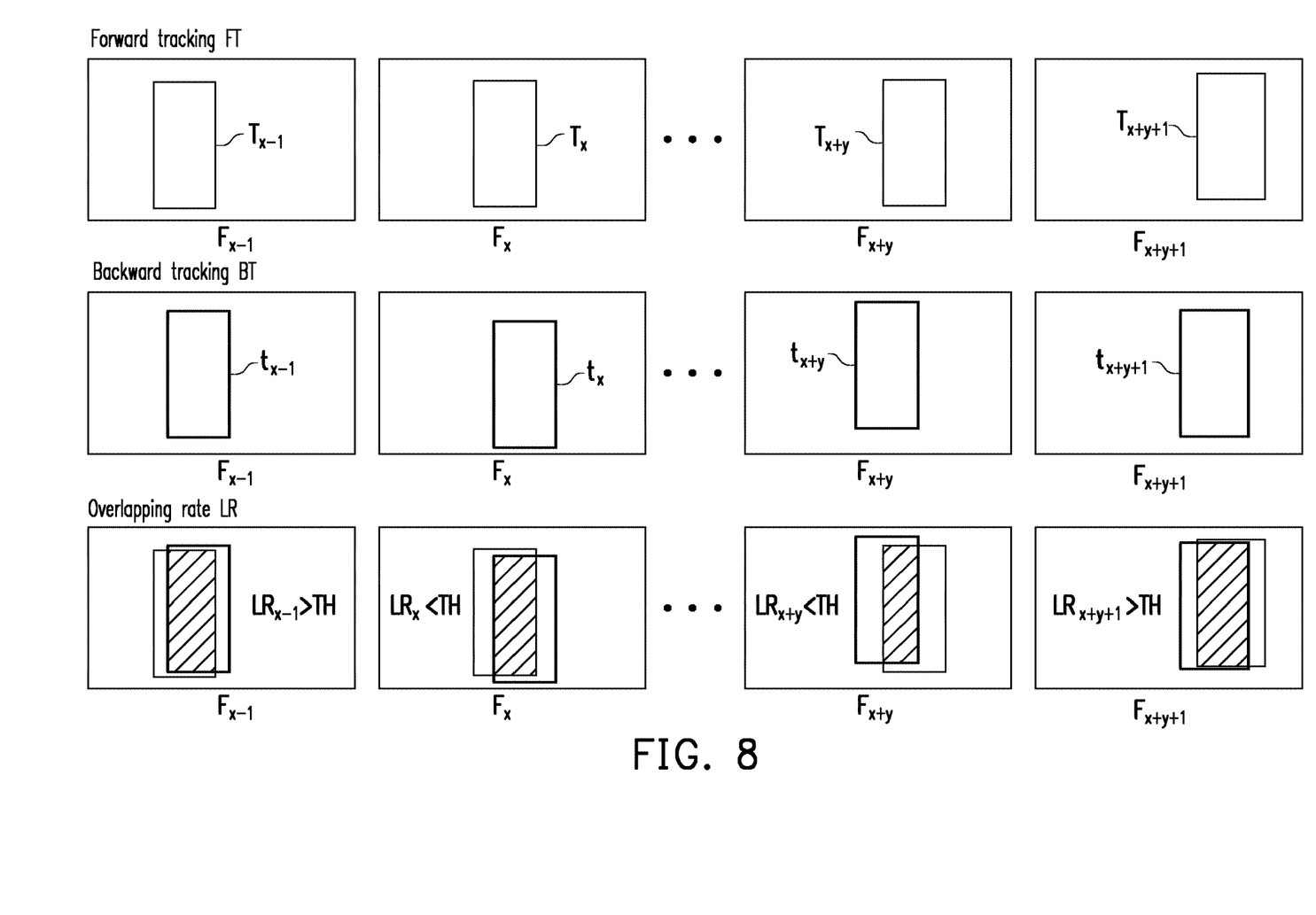
FIG. 8 is a schematic diagram of a forward tracking, a backward tracking and an overlapping rate according to an embodiment of the disclosure.

FIG. 8 is a schematic diagram of a forward tracking FT, a backward tracking BT and an overlapping rate LR according to an embodiment of the disclosure. For example, it is assumed here that the predicted positions of the target object in images $F_{x-1}$-$F_{x+y+1}$ in the image sequence by the forward tracking FT and the backward tracking BT are $T_{x-1}$-$T_{x+y+1}$ and $t_{x-1}$-$t_{x+y+1}$, respectively. Target object overlapping rates $LR_{x-1}$ and $LR_{x+y+1}$ are greater than the overlapping threshold TH (for example, the overlapping threshold is 90%), and target object overlapping rates $LR_x$-$LR_{x+y}$ are all less than the overlapping threshold TH. Therefore, the computing device 130 amends at least one of the forward tracking result and the backward tracking result of the images $F_x$-$F_{x+y}$.

According to the accuracy of the forward tracking and the accuracy of the backward tracking, there will be three cases: high accuracy in both directions, high accuracy in one direction while low accuracy in the other direction, and low accuracy in both directions. Therefore, referring back to FIG. 4, after the process proceeds to the tracking result amendment 420, the computing device 130 first pre-defines a preset standard (step S422), i.e., using one of the forward tracking and the backward tracking as the preset standard. Next, the computing device 130 starts to amend the tracking range (step S424), re-performs the tracking (step S426), and then returns to step S414 to determine whether all of the target object overlapping rates after the re-tracking are high. In response to the determination being negative, the computing device 130 still performs the tracking result amendment 420 until all of the target object overlapping rates are high.

In the first case of high accuracy in both directions but not high target object overlapping rate of some of the images, the computing device 130 first takes one direction as a preset standard. In response to the forward tracking being the preset standard, the computing device 130 obtains a last image with a low target object overlapping rate (i.e., a first image with a low target object overlapping rate in a backward view) in the image sequence in time series, which is defined herein as a "first backward executing image". Next, the computing device 130 amends the tracking range and the predicted position of the backward tracking result of the first backward executing image according to the tracking range of the forward tracking result of the first backward executing image, and recursively computes the tracking range and the predicted position of the target object in other preceding images of the first backward executing image as the amended backward tracking result.

In response to the backward tracking being the preset standard, the computing device 130 obtains a first image with a low target object overlapping rate in the image sequence in time series, which is defined herein as a "first forward executing image". Next, the computing device 130 amends the tracking range and the predicted position of the forward tracking result of the first forward executing image according to the tracking range of the backward tracking result of the first forward executing image, and recursively computes the tracking range and the predicted position of the target object in other following images of the first forward executing image as the amended forward tracking result.

Figure 9:
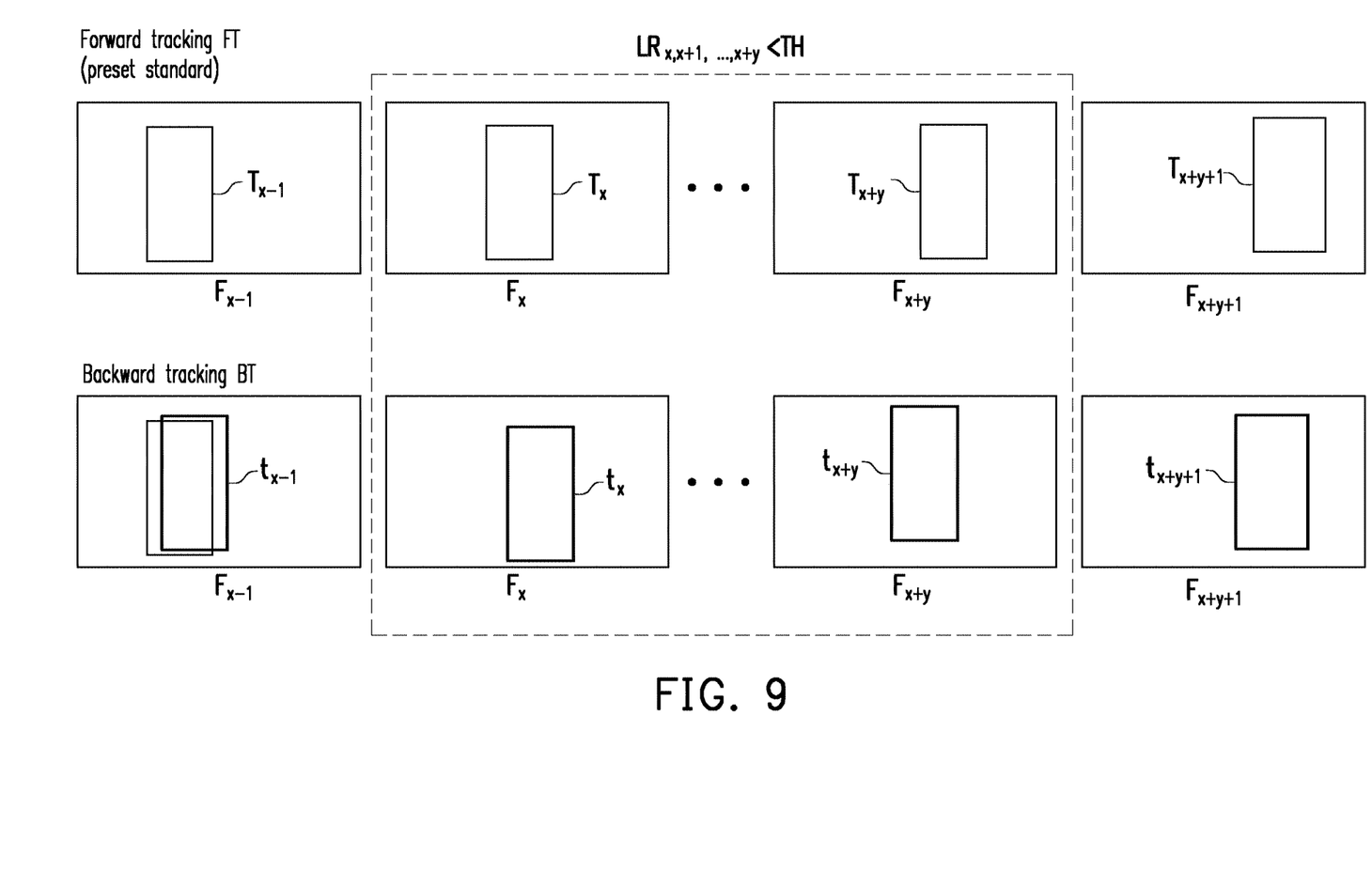
FIG. 9 is a schematic flow chart of a forward tracking and a backward tracking according to an embodiment of the disclosure.
Figure 10:
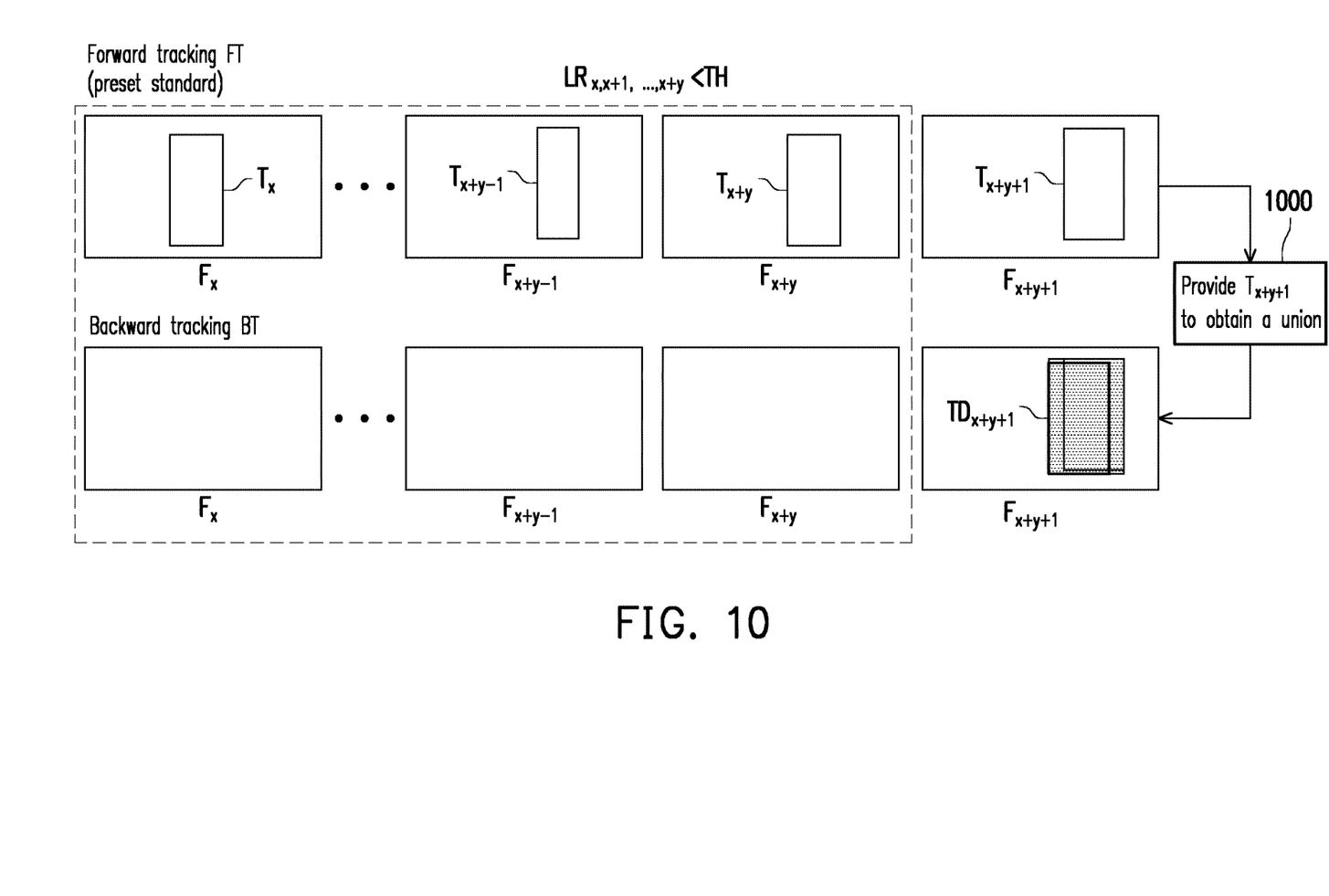
FIG. 10 is a schematic flow chart of a forward tracking and a backward tracking according to an embodiment of the disclosure.
Figure 11:
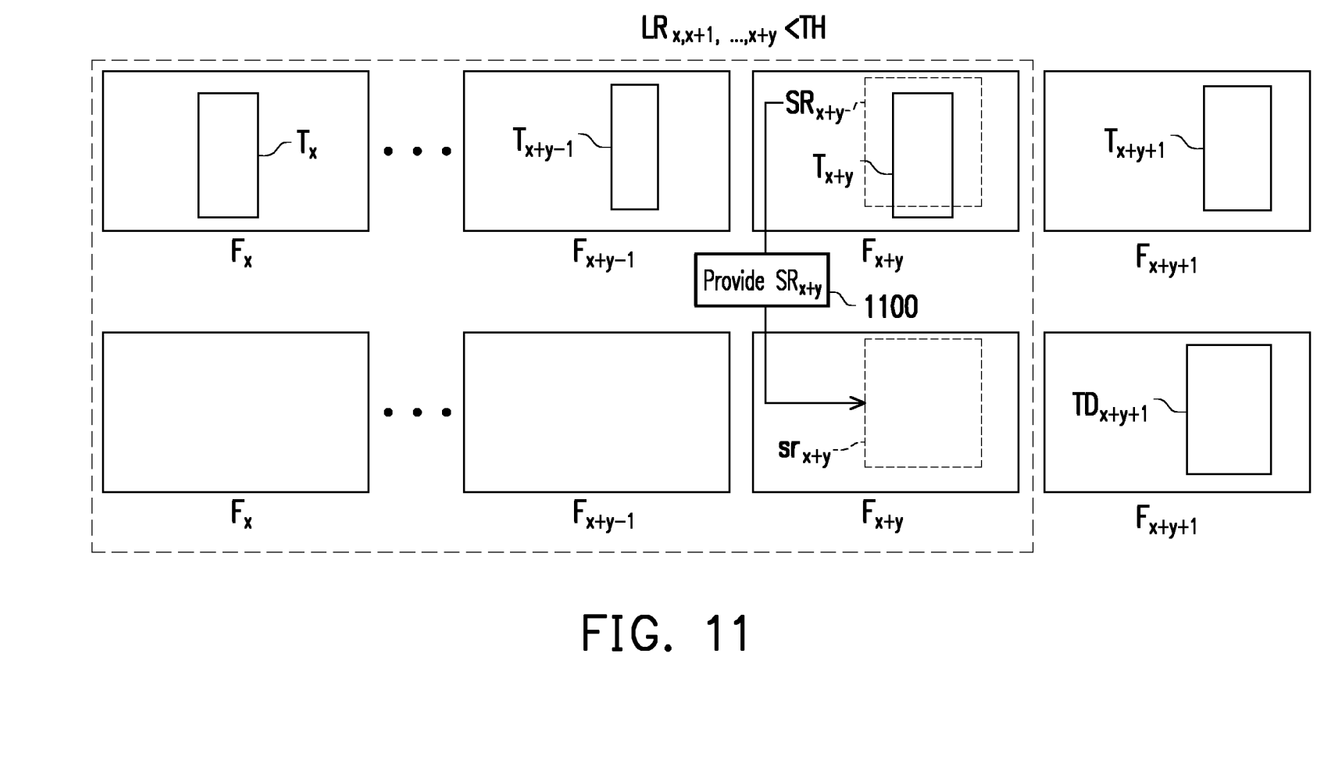
FIG. 11 is a schematic flow chart of a forward tracking and a backward tracking according to an embodiment of the disclosure.

Specifically, FIGS. 9-11 are schematic flow charts of a forward tracking FT and a backward tracking BT according to an embodiment of the disclosure.

Referring to FIG. 9, it is assumed that the predicted positions of the target object in the images $F_{x-1}$-$F_{x+y+1}$ in the image sequence by the forward tracking FT and the backward tracking BT are $T_{x-1}$-$T_{x+y+1}$ and $t_{x-1}$-$t_{x+y+1}$, respectively. The target object overlapping rates $LR_{x, x+1, \ldots, x+y}$ corresponding to the images $F_x$-$F_{x+y}$ are all less than the overlapping threshold TH. It is assumed that in the present embodiment, in response to the forward tracking FT being the preset standard, the computing device 130 amends the backward tracking result of the images $F_x$-$F_{x+y}$.

Referring to FIG. 10, since the computing device 130 takes the forward tracking FT as the preset standard, the first backward executing image is the image $F_{x+y}$, i.e., a last image with a low target object overlapping rate. In addition, the computing device 130 has already provided the predicted position $T_{x+y+1}$ of the target object in the previous image $F_{x+y+1}$ in the forward tracking to the backward tracking (1000) to obtain a union $TD_{x+y+1}$ as the final tracking result of the image $F_{x+y+1}$. Since the target object overlapping rate corresponding to the image $F_{x+y+1}$ is high, the tracking result of the image $F_{x+y+1}$ is reliable.

Referring to FIG. 11, in response to the forward tracking FT being the preset standard, the computing device 130 provides the tracking range $SR_{x+y}$ of the image $F_{x+y}$ in the forward tracking FT to the backward tracking BT for use (1100) as the tracking range $sr_{x+y}$ of the image $F_{x+y}$ in the backward tracking BT. Next, the computing device 130 re-performs the backward tracking on the image $F_{x+y}$ and the preceding images $F_{x+y-1}$-$F_x$ thereof by using the predicted position $TD_{x+y+1}$ of the target object in $F_{x+y+1}$ and the tracking range $sr_{x+y}$ of the target object in the image $F_{x+y}$. Next, the computing device 130 re-determines the target object overlapping rate corresponding to the amended predicted position in the backward tracking BT and corresponding to the predicted position $T_{x+y}$-$T_x$ in the forward tracking FT. It is assumed that if the target object overlapping rate is low (for example, the target object overlapping rate of the images $F_{x+a}$-$F_{x+y-b}$ is less than TH), the tracking result amendment is re-performed.

On the other hand, in the second case of high accuracy in one direction while low accuracy in the other direction, the computing device 130 amends the tracking result of the low-accuracy tracking direction according to the tracking result of the high-accuracy tracking direction. That is, in response to the accuracy of the forward tracking being high, the computing device 130 amends the tracking range and the predicted position of the backward tracking result according to the tracking range of the forward tracking result (i.e., the forward tracking is the preset standard). In response to the accuracy of the backward tracking being high (i.e., the backward tracking is the preset standard), the computing device 130 amends the tracking range and the predicted position of the forward tracking result according to the tracking range of the backward tracking result. For details of the tracking result amendment, please refer to the related descriptions of FIG. 9 to FIG. 11 herein. The descriptions thereof are omitted herein. In addition, in the third case of low accuracy in both directions, please refer to the related descriptions of step S412. The descriptions thereof are omitted herein.

In the present embodiment, the method for object tracking of FIG. 2 and FIG. 4 may quickly increase the type and quantity of training data to facilitate related applications of deep learning. In detail, after the computing device 130 obtains the image sequence, the user only needs to specify the target object through the input device 120 in a plurality of first and last images in the image sequence, and the computing device 130 may automatically track and label the target object from other images to save a lot of time and labour in manual labelling required to prepare training data. In other words, after the computing device completes the flow of the method for object tracking of FIG. 2 or FIG. 4, the image sequence and the generated final tracking result of the target object may be used as training data for tracking the same target object.

In other embodiments, after obtaining the tracking result of the target object in the image sequence, the computing device 130 may perform image processing on the target object in the image sequence to generate a processed image sequence. For example, the computing device 130 may mark texts in the vicinity of the target object in the image sequence, mosaic or fuzz the target object to provide privacy protection, perform image enhancement processing such as sharpness and saturation of the target object, perform trajectory analysis of the target object, etc.

Based on the above, according to the method and the computer system for object tracking provided by the disclosure, when a target object is labelled from a plurality of first and last images in an image sequence, a computing device may automatically track the target object from other images to speed up the tracking of the target object.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A method for object tracking, applicable to a computer system, comprising:
   obtaining an image sequence comprising a plurality of images, wherein the image sequence includes a target object;
   receiving a labelling operation corresponding to the target object in first two images and last two images in the image sequence to respectively generate four ground truth labels of the target object;

performing a forward tracking of the target object on the image sequence in time series according to the ground truth labels of the first two images to obtain a forward tracking result;

performing a backward tracking of the target object on the image sequence in time series according to the ground truth labels of the last two images to obtain a backward tracking result; and comparing the forward tracking result and the backward tracking result to accordingly generate a final tracking result of the target object.

2. The method according to claim 1, wherein the step of performing the forward tracking of the target object on the image sequence in time series according to the ground truth labels of the first two images to obtain the forward tracking result comprises:

computing a ground truth distance difference between the ground truth labels of the first two images; and predicting and setting tracking ranges and predicted positions of the target object in other following images following the first two images from earliest to latest in time series according to the ground truth distance difference as the forward tracking result of the target object.

3. The method according to claim 2, wherein the step of predicting and setting the tracking ranges and the predicted positions of the target object in the other following images following the first two images from earliest to latest in time series according to the ground truth distance difference as the forward tracking result of the target object comprises:

computing a tracking range of the target object in a third image in the image sequence according to the ground truth distance difference;

obtaining the predicted position of the target object within the tracking range in the third image as well as a predicted distance difference between the predicted position in the third image and the ground truth label in a preceding image of the third image so as to compute a tracking range of the target object in a fourth image in the image sequence; and recursively computing and setting the tracking ranges and the predicted positions of the target object in the fourth image and each of the other following images thereof as the forward tracking result of the target object.

4. The method according to claim 1, wherein the step of performing the backward tracking of the target object on the image sequence in time series according to the ground truth labels of the last two images to obtain the backward tracking result comprises:

computing a ground truth distance difference between the ground truth labels of the last two images; and predicting and setting tracking ranges and predicted positions of the target object in other preceding images preceding the last two images from latest to earliest in time series according to the ground truth distance difference as the backward tracking result of the target object.

5. The method according to claim 4, wherein the step of predicting and setting the tracking ranges and the predicted positions of the target object in other preceding images preceding the last two images from latest to earliest in time series according to the ground truth distance difference as the backward tracking result of the target object comprises:

computing a tracking range of the target object in a last third image in the image sequence according to the ground truth distance difference;

obtaining the predicted position of the target object within the tracking range in the last third image as well as a predicted distance difference between the predicted position in the last third image and the ground truth label in a following image of the last third image so as to compute a tracking range of the target object in a last fourth image in the image sequence; and recursively computing and setting the tracking ranges and the predicted positions of the target object in the last fourth image and each of the other preceding images thereof as the backward tracking result of the target object.

6. The method according to claim 1, wherein the step of comparing the forward tracking result and the backward tracking result to accordingly generate the final tracking result of the target object comprises:

obtaining an accuracy of the forward tracking according to the ground truth label in a last image of the last two images and the forward tracking result;

obtaining an accuracy of the backward tracking according to the ground truth label in a first image of the first two images and the backward tracking result; and generating the final tracking result of the target object according to the accuracy of the forward tracking and the accuracy of the backward tracking.

7. The method according to claim 6, wherein the step of obtaining the accuracy of the forward tracking according to the ground truth label in the last image of the last two images and the forward tracking result comprises:

determining a target object overlapping rate between the ground truth label of the target object and a predicted position of the target object associated with the forward tracking result in the last image;

in response to the target object overlapping rate being greater than an overlapping threshold, determining that the accuracy of the forward tracking is high; and in response to the target object overlapping rate not being greater than the overlapping threshold, determining that the accuracy of the forward tracking is low.

8. The method according to claim 6, wherein the step of obtaining the accuracy of the backward tracking according to the ground truth label in the first image of the first two images and the backward tracking result comprises:

determining a target object overlapping rate between the ground truth label of the target object and a predicted position of the target object associated with the backward tracking result in the first image;

in response to the target object overlapping rate being greater than an overlapping threshold, determining that the accuracy of the backward tracking is high; and in response to the target object overlapping rate not being greater than the overlapping threshold, determining that the accuracy of the backward tracking is low.

9. The method according to claim 6, wherein the step of generating the final tracking result of the target object according to the accuracy of the forward tracking and the accuracy of the backward tracking comprises:

in response to both of the accuracy of the forward tracking and the accuracy of the backward tracking being low, determining that the final tracking result is unreliable.

10. The method according to claim 6, wherein the step of generating the final tracking result of the target object according to the accuracy of the forward tracking and the accuracy of the backward tracking comprises:

in response to at least one of the accuracy of the forward tracking and the accuracy of the backward tracking being high, determining each target object overlapping rate of the forward tracking result and the backward tracking result so as to accordingly determine whether to amend the forward tracking result or amend the backward tracking result to generate the final tracking result of the target object.

11. The method according to claim 10, wherein in response to both of the accuracy of the forward tracking and the accuracy of the backward tracking being high, the step of determining each of the target object overlapping rates of the forward tracking result and the backward tracking result so as to accordingly determine whether to amend the forward tracking result or amend the backward tracking result to generate the final tracking result of the target object comprises:
  determining whether all of the target object overlapping rates of the forward tracking result and the backward tracking result are high;
  in response to the determination being affirmative, not amending the forward tracking result and the backward tracking result, and determining that the final tracking result is reliable; and
  in response to the determination being negative, amending at least one of the forward tracking result and the backward tracking result.

12. The method according to claim 11, wherein the step of amending at least one of the forward tracking result and the backward tracking result comprises:
  in response to the forward tracking being a preset standard:
    obtaining a first backward executing image in the image sequence, wherein the first backward executing image is a last image with a low target object overlapping rate in the image sequence;
    amending a tracking range and a predicted position of the backward tracking result of the first backward executing image according to a tracking range of the forward tracking result of the first backward executing image; and
    recursively computing and setting the tracking range and the predicted position of the target object in each of other preceding images of the first backward executing image as the amended backward tracking result of the target object; and
  in response to the backward tracking being the preset standard:
    obtaining a first forward executing image in the image sequence, wherein the first forward executing image is a first image with a low target object overlapping rate in the image sequence;
    amending the tracking range and the predicted position of the forward tracking result of the first forward executing image according to the tracking range of the backward tracking result of the first forward executing image; and
    recursively computing and setting the tracking range and the predicted position of the target object in each of other following images of the first forward executing image as the amended forward tracking result of the target object.

13. The method according to claim 10, wherein in response to only one of the accuracy of the forward tracking and the accuracy of the backward tracking being high, the step of determining each of the target object overlapping rates of the forward tracking result and the backward tracking result so as to accordingly determine whether to amend the forward tracking result or amend the backward tracking result comprises:
  in response to the accuracy of the forward tracking being high:
    obtaining a first backward executing image in the image sequence, wherein the first backward executing image is a last image with a low target object overlapping rate in the image sequence;
    amending a tracking range and a predicted position of the backward tracking result of the first backward executing image according to the tracking range of the forward tracking result of the first backward executing image; and
    recursively computing and setting the tracking range and the predicted position of the target object in each of other preceding images of the first backward executing image as the amended backward tracking result of the target object; and
  in response to the accuracy of the backward tracking being high:
    obtaining a first forward executing image in the image sequence, wherein the first forward executing image is a first image with a low target object overlapping rate in the image sequence;
    amending the tracking range and the predicted position of the forward tracking result of the first forward executing image according to the tracking range of the backward tracking result of the first forward executing image; and
    recursively computing and setting the tracking range and the predicted position of the target object in each of other following images of the first forward executing image as the amended forward tracking result of the target object.

14. The method according to claim 1, wherein in response to the final tracking result of the target object being reliable, the method further comprises:
  setting the image sequence as training data for tracking the target object according to the final tracking result.

15. The method according to claim 1, wherein in response to the final tracking result of the target object being reliable, the method further comprises:
  performing image processing on the target object in the image sequence according to the final tracking result to generate a processed image sequence.

16. A computer system comprising:
  a display, configured to display a frame;
  an input device, configured to receive an operation of a user;
  a computing device, configured to:
    obtain an image sequence comprising a plurality of images, wherein the image sequence includes a target object;
    receive a labelling operation corresponding to the target object in first two images and last two images in the image sequence to respectively generate four ground truth labels of the target object;
    perform a forward tracking of the target object on the image sequence in time series according to the ground truth labels of the first two images to obtain a forward tracking result;
    perform a backward tracking of the target object on the image sequence in time series according to the ground truth labels of the last two images to obtain a backward tracking result; and compare the forward tracking result and the backward tracking result to accordingly generate a final tracking result of the target object.

17. The computer system according to claim 16, wherein the computing device obtains an accuracy of the forward tracking according to the ground truth label in a last image of the last two images and the forward tracking result, obtains an accuracy of the backward tracking according to the ground truth label in a first image of the first two images and the backward tracking result, and generates the final tracking result of the target object according to the accuracy of the forward tracking and the accuracy of the backward tracking.

18. The computer system according to claim 17, wherein in response to at least one of the accuracy of the forward tracking and the accuracy of the backward tracking being high, the computing device determines each target object overlapping rate of the forward tracking result and the backward tracking result so as to accordingly determine whether to amend the forward tracking result or amend the backward tracking result to generate the final tracking result of the target object.

19. The computer system according to claim 16, wherein in response to the final tracking result of the target object being reliable, the computing device further sets the image sequence as training data for tracking the target object according to the final tracking result.

20. The computer system according to claim 16, wherein in response to the final tracking result of the target object being reliable, the computing device further performs image processing on the target object in the image sequence according to the final tracking result to generate a processed image sequence.

* * * * *